Dec. 14, 1965  J. L. ZAMBROW ETAL  3,222,773
PROCESS FOR ASSEMBLING CONCENTRICALLY SPACED
NUCLEAR FUEL ELEMENTS
Filed Aug. 29, 1960
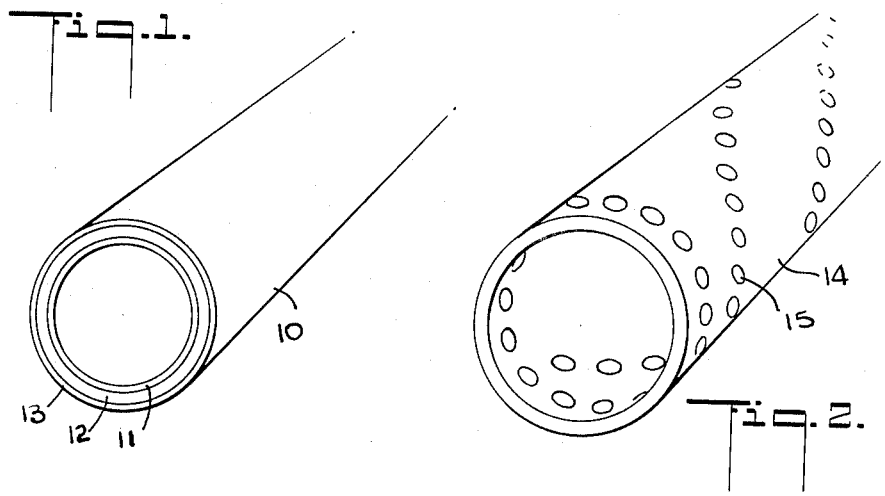
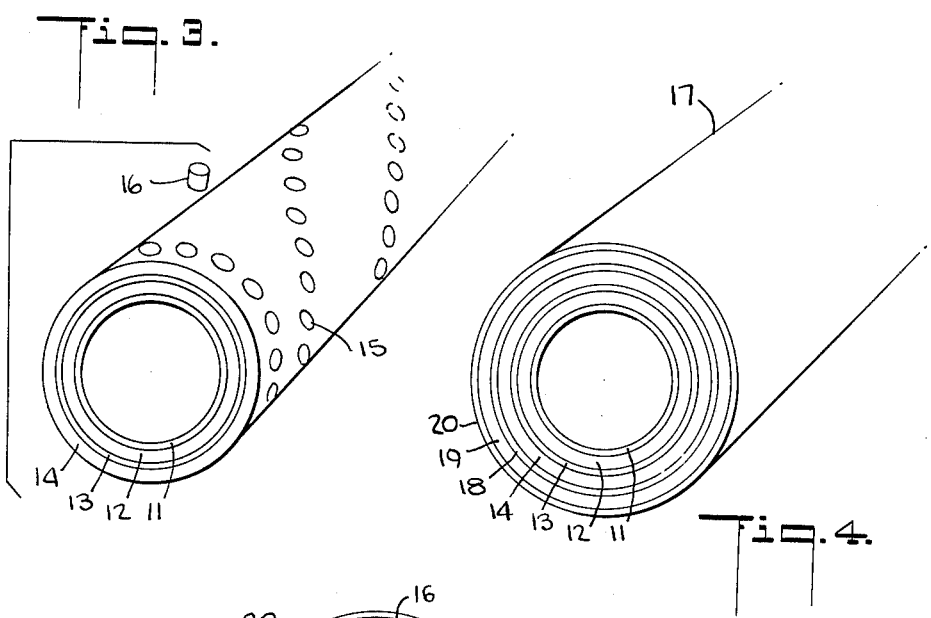
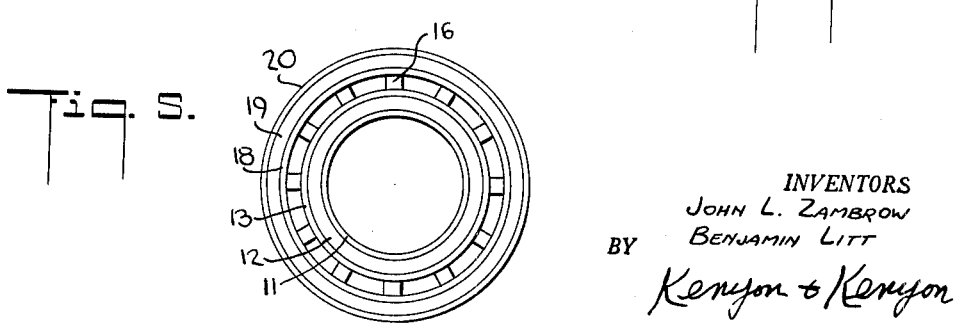
INVENTORS
JOHN L. ZAMBROW
BENJAMIN LITT
BY
Kenyon & Kenyon
ATTORNEYS

# United States Patent Office 3,222,773
Patented Dec. 14, 1965

3,222,773
PROCESS FOR ASSEMBLING CONCENTRICALLY SPACED NUCLEAR FUEL ELEMENTS
John L. Zambrow, Westbury, and Benjamin Litt, Flushing, N.Y., assignors, by mesne assignments, to Sylvania Electric Products Inc., a corporation of Delaware
Filed Aug. 29, 1960, Ser. No. 52,450
9 Claims. (Cl. 29—474.3)

This invention relates in general to cylinders held within tubes and processes of assembly and more particularly to nuclear fuel cylinders held in spaced relationship within nuclear fuel tubes and processes of assembly.

The advantages of arranging tubular and cylindrical nuclear fuel members within each other accrue in the form of a more compact arrangement and greater heat transfer surface presented to the coolant stream which cools the nuclear fuel element and carries away the heat for use in heating, or conversion into another form of energy. To attain these advantages, tubes have heretofore been separated within each other by wire spacers extending the lengths of the tubes, or by mechanical holders at each end of the tubes.

Disadvantages in the prior art may be seen in that the wire spacers tend to scratch the extremely thin coating of cladding material over the nuclear fuel members upon assembly and in some instances to break through the cladding. Since the function of cladding is to prevent corrosion and erosion of the nuclear fuel, it is easy to detect the dangers inherent in the foregoing process. Another disadvantage is that the wire spacers become conductors to bridge the gap between nuclear fuel tubes causing hot spots.

When wire spacers are of a larger diameter than the spacing between the nuclear fuel members, the thin nuclear fuel tubes tend to go out of round and consequently cause hot spots to develop. On the other hand if the wire spacers are too small a diameter to bridge the space between nuclear fuel members, they will vibrate in the coolant stream, scratching the cladding material and causing the difficulties hereinbefore described. Eventually, the wire spacers will tend to disintegrate into small pieces and join the cooling system to render the nuclear fuel element useless. Wire spacers also have a tendency to break off during assembly.

Mechanical holders at each end of the nuclear fuel members have proven to be no better than wire spacres. The holders at each end of the nuclear fuel members tend not to maintain the spacing in the middle of the tubes because of sagging. Hot spots develop and the nuclear fuel members rapidly become useless. The present needs of the art demand gaps as small as one-sixteenth of an inch between nuclear fuel members over a length of many many feet. If thin tubes are used, the problem is accentuated. The metal holders also tend to offer high resistance to coolant flow. To maintain separation accurately from the ends of the tubes, it is readily apparent that the holders must contain much structure. This same structure tends to impede the flow of coolant between the tubes and reduce the efficiency of the entire reactor. Any clogging of the holders would be disastrous, as the temperatures would rapidly go out of control.

The basic problem of the art is thus the absolute requirement that large quantities of heat be dissipated quickly. The ceramic nature of most nuclear fuels has thus necessitated all manner of configurations of clad fuel for heat transfer. Tubular configurations with central cylinders or tubes are favored constructions for compactness, but the small diameter and thickness and large length required by the art have created the serious fabrication difficulties described.

Briefly, the present invention contemplates solving the recited deficiencies in the prior art by providing spacers throughout the common length of the nuclear fuel members by a unique process presently to be described.

It is therefore an object of the invention to permit assembly of cylinders within tubes to closer tolerances in the spacing between the cylinder and tubes.

Another object of the invention is to obtain uniform spacing along the entire common length of cylinders within tubes.

Another object of the invention is to obtain a cylindrical-tubular structure of greater resultant strength.

Another object of the invention is to permit assembly of cylinders within tubes without scratching the surfaces thereof and without having particles breaking off therein.

A still further object of the invention is to provide spacers for use between cylinders and tubes which will not vibrate because of flow between the cylinders and tubes, which will not abrade through any cladding material on cylinders and tubes and which will not disintegrate, and at the same time which will offer low resistance to coolant flow.

Yet another object of the invention is to provide an economical means for manufacturing and assembling cylinders within tubes without the necessity for expensive gauges.

Other objects and a fuller understanding of the invention may be had by referring to the following description and claims, taken in conjunction with the accompanying drawings in which:

FIG. 1 is a perspective view of an inner tube with cladding thereon.

FIG. 2 is a perspective view of an intermediate tube with holes therein.

FIG. 3 is an exploded perspective view of the intermediate tube over the inner tube with cladding thereon and a spacer about to be inserted into one of the holes in the intermediate tube.

FIG. 4 is a perspective view of an outer tube with cladding thereon over the intermediate tube containing spacers (not shown) and the inner tube with cladding thereon.

FIG. 5 is an end view of the assembly of FIG. 4 after the intermediate tube has been removed and showing the spacers separating the tubes with cladding thereon.

With reference to the drawings, one embodiment of the invention contemplates a nuclear fuel member 10 formed by covering an inner nuclear fuel tube 12 with inside cladding 11 and outside cladding 13 as shown in FIG. 1.

An intermediate tube 14 is formed as shown in FIG. 2 having holes 15 arranged in a spiral or some other pattern throughout the length of the tube. The intermediate tube 14 is then passed over the inner nuclear fuel tube 12 covered with cladding 11 and 13, as shown in FIG. 3. Spacers 16 are placed by hand or by machine into the holes 15 in the intermediate tube 14.

An outer nuclear fuel member 17 formed by covering an outer nuclear fuel tube 19 with inside cladding 18 and outside cladding 20 is then passed over the intermediate tube 14 with spacers 16 therein as shown in FIG. 4.

The foregoing assembly is then hot compressed or hot isostatically pressed under a maximum pressure of 14,000 p.s.i. at 1200° C. for one hour to metallurgically bond the ends of the spacers 16 to at least one of the cladding 18 of the outer nuclear fuel tube 19 and the cladding 13 of the inner nuclear fuel tube 12. If it is desired to bond only one end of the spacers 16 as aforesaid described to allow for longitudinal thermal expansion between the tubes, one end of the spacers 16 may be oxidized before assembly into the intermediate tube 14 so that only the other end will metallurgically bond.

After hot compressing, the intermediate tube 14 is removed to leave the structure as best shown in FIG. 5. An oxidizing acid such as nitric acid may be used to dissolve the intermediate tube 14 leaving the nuclear fuel tubes 12 and 19 with cladding 11, 13, 18 and 20 thereon, separated as desired by the spacers 16 throughout the common length. If the intermediate tube 14 is made of a material such as iron, the nitric acid will attack the metal converting it into nitrates. The cladding 11, 13, 18 and 20 and spacers 16 may be made of a suitable cladding material such as stainless steel or aluminum which will become passivated by the nitric acid and show very little attack. Thus a result is accomplished which heretofore has been impossible. Nuclear fuel tubes are separated accurately throughout the entire common length to very close tolerance by spacers 16 which offer very little resistance to coolant flow, and which do not stress and distort the assembly as wires forced between the tubes are inclined to do.

A second embodiment of the invention may be realized by inserting an inner cladding tube 11 into the inner nuclear fuel tube 12 and passing an outer cladding tube 13 over the inner nuclear fuel tube 12 to form the nuclear fuel member 10. The assembly of the first embodiment is completed through the step of inserting spacers 16 into the holes 15 in the intermediate tube 14. The foregoing and subsequent steps being illustrated by the same figures as used in the first embodiment. Then an inner cladding tube 18 for the outer tubular nuclear fuel element 19 is passed over the intermediate tube 14 with spacers 16 therein. The outer nuclear fuel tube 19 is then passed over the inner cladding tube 18 for the outer nuclear fuel tube 19 and the outer cladding tube 20 for the outer nuclear fuel tube 19 is passed over the outer nuclear fuel tube 19.

The assembly thereof is hot compressed or hot isostatically compressed as described in detail in the first embodiment to metallurgically bond the cladding tubes 11, 13, 18 and 20 to the corresponding nuclear fuel tubes 12 and 19 and the ends of the spacers 16 to at least one of the cladding tube 13 and the cladding tube 18, the aforementioned process being performed all in one operation.

The intermediate tube 14 is then removed with an oxidizing acid such as nitric acid which attacks the intermediate tube 14, but passivates the cladding tubes 11, 13, 18 and 20 and the spacers 16 as hereinbefore described in the first embodiment.

Although the invention has been described with a certain degree of particularity, it is understood that the present disclosure has been made only by way of example and that numerous changes in the details of construction and the combination and arrangement of parts may be resorted to without departing from the spirit and the scope of the invention. For instance, the present disclosure describes nuclear fuel members with a great degree of particularity. However, the process may be used for other applications wherein it is desired to hold tubes within tubes in a spaced relationship. Also, solid cylinders may be utilized in place of the inner tube without departing from the scope of the invention.

What is claimed is:

1. The method of obtaining a spaced relationship between an outer tube and an inner cylinder which comprises passing an intermediate tube having radially extending perforations spaced apart from one another over said inner cylinder, placing dowels in said perforations, said dowels having a length sufficient to engage said outer tube and said inner cylinder when in said spaced relationship, passing said outer tube over said intermediate tube, attaching ends of said dowels to at least one of said outer tube and said inner cylinder, and removing said intermediate tube.

2. The method of obtaining a spaced relationship between an outer tube and an inner cylinder, at least one of the adjacent surfaces of said outer tube and said inner cylinder being metallic, said method comprising passing an intermediate tube having radially extending perforations spaced apart from one another over said inner cylinder, placing dowels in said perforations, said dowels having a length sufficient to engage said outer tube and said inner cylinder when in said spaced relationship, passing said outer tube over said intermediate tube, the surface of at least one end of said dowels disposed adjacent to said one surface being metallic, hot compressing the foregoing assembly to metallurgically bond at least said one end of said dowels to at least one of said outer tube and said inner cylinder, and removing said intermediate tube with a solvent thereof.

3. The method of obtaining a spaced relationship between an outer tubular nuclear fuel element covered with cladding material and an inner cylindrical nuclear fuel element covered with cladding material which comprises passing an intermediate tube having radially extending perforations spaced apart from one another over said inner cylindrical nuclear fuel element, placing dowels in said perforations, said dowels having a length sufficient to engage said outer tube and said inner cylinder when in said spaced relationship, passing said outer tubular nuclear fuel element over said intermediate tube, attaching ends of said dowels to at least one of said outer tubular nuclear fuel element and said inner cylindrical nuclear fuel element, and removing said intermediate tube with a solvent thereof.

4. The method of obtaining a spaced relationship between an outer tubular nuclear fuel element covered with metal cladding material and an inner cylindrical nuclear fuel element covered with metal cladding material which comprises passing an intermediate tube having radially extending perforations spaced apart from one another over said inner cylindrical nuclear fuel element, placing dowels in said perforations, said dowels having a length sufficient to engage said outer tube and said inner cylinder when in said spaced relationship, the surface of at least one end of said dowels being metallic, passing said outer tubular nuclear fuel element over said intermediate tube, hot compressing the foregoing assembly to metallurgically bond at least said one end of said dowels to the cladding of at least one of said outer tubular nuclear fuel element and said inner cylindrical nuclear fuel element and removing said intermediate tube with a solvent thereof.

5. The method of obtaining a spaced relationship between an outer tubular nuclear fuel element covered with cladding material and an inner cylindrical nuclear fuel element covered with cladding material which comprises passing an intermediate tube over said inner cylindrical nuclear fuel element, said intermediate tube having radially extending perforations spaced apart from one another and having a wall thickness sufficient to substantially fill the distance between said inner cylindrical nuclear fuel element and said outer tubular nuclear fuel element when said outer tubular nuclear fuel element is disposed about said inner cylindrical nuclear fuel element; placing dowels in said perforations, each dowel having sufficient length to substantially fill a perforation in said intermediate tube; passing said outer tubular nuclear fuel element over said intermediate tube; attaching ends of said dowels to at least one of said outer tubular nuclear fuel element and said inner cylindrical nuclear fuel element; and removing said intermediate tube by dissolving in a solvent thereof.

6. The method of obtaining uniform spacing between an outer tubular nuclear fuel element covered with cladding material and an inner cylindrical nuclear fuel element covered with cladding material which comprises passing an intermediate tube over said inner cylindrical nuclear fuel element, said intermediate tube having a plurality of radially extending holes spaced apart from one another and having a substantially uniform wall thickness substantially equal to the distance between said inner cylindrical nuclear fuel element and said outer tubular nuclear fuel element when said outer tubular nuclear fuel element is disposed about said inner cylindrical nuclear fuel element; placing dowels in said holes, each dowel having sufficient length to substantially fill a hole in said intermediate tube; passing said outer tubular nuclear fuel element over said intermediate tube; attaching ends of said dowels to at least one of said outer tubular nuclear fuel element; and said inner cylindrical nuclear fuel element; and removing said intermediate tube by dissolving in a solvent thereof.

7. The method of obtaining a fixed spaced relationship between an inner tubular nuclear fuel element covered with metal cladding material and an outer tubular nuclear fuel element covered with metal cladding material which comprises passing an intermediate tube over said inner tubular nuclear fuel element, said intermediate tube having radially extending perforations spaced apart from one another and having a wall thickness to substantially fill the distance between said inner tubular nuclear fuel element and said outer tubular nuclear fuel element when said outer tubular nuclear fuel element is disposed about said inner cylindrical nuclear fuel element; placing dowels having inner ends and outer ends in said perforations, the surface of said inner and outer ends being metallic, each dowel having sufficient length to substantially fill a perforation in said intermediate tube; passing said outer tubular nuclear fuel element over said intermediate tube; hot compressing the foregoing assembly to metallurgically bond the inner ends of said dowels to the cladding material of said inner tubular nuclear fuel element and to metallurgically bond the outer ends of said dowels to the cladding material of said outer tubular nuclear fuel element; and removing said intermediate tube by dissolving in a solvent thereof.

8. The method of obtaining uniform spacing between an inner tubular nuclear fuel element covered with cladding material and an outer tubular nuclear fuel element covered with cladding material which comprises passing an intermediate tube over said inner tubular nuclear fuel element, said intermediate tube having a plurality of radially extending holes spaced apart from one another and having a substantially uniform wall thickness substantially equal to the distance between said inner tubular nuclear fuel element and said outer tubular nuclear fuel element when said outer tubular nuclear fuel element is disposed about said inner cylindrical nuclear fuel element; placing dowels having inner ends and outer ends in said holes, the surface of said inner and outer ends being metallic, each dowel having sufficient length to substantially fill a hole in said intermediate tube; passing said outer tubular nuclear fuel element over said intermediate tube; hot compressing the foregoing assembly to metallurgically bond the inner ends of said dowels to the cladding material of said inner tubular nuclear fuel element and to metallurgically bond the outer ends of said dowels to the cladding material of said outer tubular nuclear fuel element; and removing said intermediate tube by dissolving in a solvent thereof.

9. The method of making a nuclear fuel element comprising placing a first metal cladding tube within a first nuclear fuel tube, passing a second metal cladding tube over said first nuclear fuel tube, passing an intermediate tube having radially extending holes spaced apart from one another therein over said second cladding tube, placing spacers in said holes in said intermediate tube, the surface of at least one of the ends of said spacers being metallic, passing a third metal cladding tube over said intermediate tube, passing a second nuclear fuel tube over said third cladding tube, passing a fourth metal cladding tube over said second nuclear fuel tube, hot pressing the foregoing assembly to metallurgically bond the first and second cladding tubes to the first nuclear fuel tube and the third and fourth cladding tubes to the second nuclear fuel tube and the ends of said spacers to at least one of the nuclear fuel tubes, and removing said intermediate tube with a solvent thereof.

References Cited by the Examiner

UNITED STATES PATENTS

| | | | |
|---|---|---|---|
| 195,618 | 9/1877 | Levis | 138—113 |
| 268,860 | 12/1882 | Browell | 138—113 |
| 1,909,075 | 5/1933 | Ricker et al. | 138—113 XR |
| 1,930,285 | 10/1933 | Robinson | 29—455 XR |
| 2,117,500 | 5/1938 | Rambush | 29—455 |
| 2,475,635 | 7/1949 | Parsons | 138—114 XR |
| 2,836,884 | 6/1958 | Graham | 29—423 |
| 2,851,771 | 9/1958 | Pottmeyer | 29—474.3 XR |
| 2,856,340 | 10/1958 | Wigner et al. | 176.83 XR |
| 2,890,158 | 6/1959 | Ohlinger et al. | 204—193.2 |
| 2,904,879 | 9/1959 | Widmer | 29—423 |
| 2,930,115 | 3/1960 | Dietzsch et al. | 29—423 XR |
| 2,938,562 | 5/1960 | Watt et al. | 29—423 |
| 2,947,078 | 8/1960 | Pflumm et al. | 29—498 XR |
| 2,949,416 | 8/1960 | Wheelock | 204—193.2 |
| 3,044,160 | 7/1962 | Jaffee | 29—423 |

FOREIGN PATENTS

| | | |
|---|---|---|
| 802,806 | 10/1958 | Great Britain. |
| 842,330 | 7/1960 | Great Britain. |
| 1,206,938 | 2/1960 | France. |
| 1,210,904 | 3/1960 | France. |

OTHER REFERENCES

"Nuclear Fuel Elements," Hausner & Shumar, Reinhold Publishing Corp., 1959, pp. 28, 29, 170–183.

JOHN F. CAMPBELL, *Primary Examiner.*

L. D. ROSDOL, *Examiner.*

R. L. GOLDBERG, P. M. COHEN, *Assistant Examiners.*